United States Patent
Park

(10) Patent No.: US 12,091,908 B2
(45) Date of Patent: Sep. 17, 2024

(54) NEGATIVE POISSON'S RATIO MATERIALS FOR DOORS AND WINDOWS

(71) Applicant: Joon Bu Park, Las Vegas, NV (US)

(72) Inventor: Joon Bu Park, Las Vegas, NV (US)

(*) Notice: Subject to any disclaimer, the term of this patent is extended or adjusted under 35 U.S.C. 154(b) by 103 days.

(21) Appl. No.: 17/971,053

(22) Filed: Oct. 21, 2022

(65) Prior Publication Data
US 2024/0133231 A1 Apr. 25, 2024
US 2024/0229546 A9 Jul. 11, 2024

(51) Int. Cl.
| | | |
|---|---|---|
| E06B 3/70 | (2006.01) |
| E05B 1/00 | (2006.01) |
| E05B 27/00 | (2006.01) |
| E05B 63/00 | (2006.01) |
| E05D 9/00 | (2006.01) |
| E06B 3/82 | (2006.01) |
| E06B 5/10 | (2006.01) |

(52) U.S. Cl.
CPC .............. *E06B 5/10* (2013.01); *E05B 1/0007* (2013.01); *E05B 27/0003* (2013.01); *E05B 63/00* (2013.01); *E05D 9/00* (2013.01); *E06B 3/82* (2013.01); *E06B 2003/7049* (2013.01); *E06B 2003/7051* (2013.01)

(58) Field of Classification Search
CPC ..... E06B 2003/7046; E06B 2003/7049; E06B 2003/7051; E05B 1/0007; E05B 27/0003; E05B 3/00
See application file for complete search history.

(56) References Cited

U.S. PATENT DOCUMENTS

| | | | | |
|---|---|---|---|---|
| 4,132,042 A | * | 1/1979 | Di Maio | E06B 3/825 428/116 |
| 4,213,317 A | * | 7/1980 | Ruff | E05B 17/00 70/461 |

(Continued)

FOREIGN PATENT DOCUMENTS

| | | |
|---|---|---|
| CN | 108304621 | 7/2018 |
| CN | 109808468 | 5/2019 |

(Continued)

OTHER PUBLICATIONS

International Search Report and Written Opinion in International Appln. No. PCT/US2023/035119, mailed Jan. 23, 2024, 13 pages.

(Continued)

*Primary Examiner* — Kyle J. Walraed-Sullivan
(74) *Attorney, Agent, or Firm* — Fish & Richardson P.C.

(57) ABSTRACT

A door includes a rectangular panel having a first face, a second face, and two pairs of opposing edges, in which the edges of each pair of edges are parallel and in which a first pair of edges is longer than a second pair of edges. The rectangular panel includes a layered composite material, in which a first layer of the composite material has a positive Poisson's ratio (PPR) and a second layer of the composite material is disposed in contact with the first layer and that includes a material having a negative Poisson's ratio (NPR). The door includes a hinge including plates joined together by a joint, in which a first one of the plates is attached to a first one of the edges of the first pair of edges and in which a second one of the plates extends beyond the first one of the edges. The door also includes a handle opening defined through a thickness of the rectangular panel.

21 Claims, 11 Drawing Sheets

(56) References Cited

U.S. PATENT DOCUMENTS

| | | | | |
|---|---|---|---|---|
| 4,281,479 | A | * | 8/1981 | Daus ................. E06B 3/827 49/503 |
| 4,294,055 | A | * | 10/1981 | Andresen ............ B32B 37/00 428/116 |
| 5,305,577 | A | * | 4/1994 | Richards ............ B32B 13/04 428/218 |
| 5,466,211 | A | * | 11/1995 | Komarek ............ B31F 1/08 428/116 |
| 5,875,608 | A | * | 3/1999 | Quinif ................ B32B 3/12 428/116 |
| 6,132,836 | A | * | 10/2000 | Quinif ................ E06B 3/7017 428/116 |
| 9,085,933 | B1 | * | 7/2015 | Crittenden ......... E06B 5/14 |
| 9,376,796 | B2 | | 6/2016 | Ma |
| 2002/0150697 | A1 | * | 10/2002 | Swager ............... C09K 11/06 252/299.1 |
| 2005/0193655 | A1 | * | 9/2005 | Paxton ............... E06B 3/5892 52/204.591 |
| 2005/0198907 | A1 | * | 9/2005 | McKnight ........... E05B 81/00 49/475.1 |
| 2009/0038261 | A1 | * | 2/2009 | Lee ..................... E06B 3/7017 156/212 |
| 2009/0047535 | A1 | * | 2/2009 | Crilly ................. E06B 7/28 428/542.6 |
| 2011/0064909 | A1 | | 3/2011 | Alderson et al. |
| 2014/0000194 | A1 | * | 1/2014 | Daniels ............. E06B 5/164 52/784.11 |
| 2014/0000196 | A1 | * | 1/2014 | Daniels ............. E06B 3/74 52/794.1 |
| 2016/0010386 | A1 | * | 1/2016 | Gouge ................ E06B 3/5892 49/506 |
| 2018/0174565 | A1 | | 6/2018 | Martino Gonzalez et al. |
| 2018/0272649 | A1 | | 9/2018 | Bertoldi et al. |
| 2018/0320435 | A1 | * | 11/2018 | Bertovic ............. E06B 3/7005 |
| 2019/0048623 | A1 | | 2/2019 | Ehrlich et al. |
| 2019/0264610 | A1 | * | 8/2019 | Martino-Gonzalez ............ B64D 13/00 |
| 2020/0024189 | A1 | * | 1/2020 | Abe .................... E06B 3/66304 |
| 2020/0346420 | A1 | | 11/2020 | Friedrich |
| 2021/0277706 | A1 | * | 9/2021 | Gouge ................ E06B 3/06 |
| 2023/0292622 | A1 | * | 9/2023 | Farhangdoust ...... H10N 30/306 |

FOREIGN PATENT DOCUMENTS

| | | |
|---|---|---|
| CN | 112252507 | 1/2021 |
| PL | 238840 | 10/2021 |

OTHER PUBLICATIONS

Wikipedia [online], "Door," available on or before Dec. 2, 2021, retrieved from internet archive: Wayback Machine URL <https://web.archive.org/web/20211202045604/https://en.wikipedia.org/wiki/Door>, retrieved Feb. 21, 2023, URL <https://en.wikipedia.org/wiki/Door>, 26 pages.

* cited by examiner

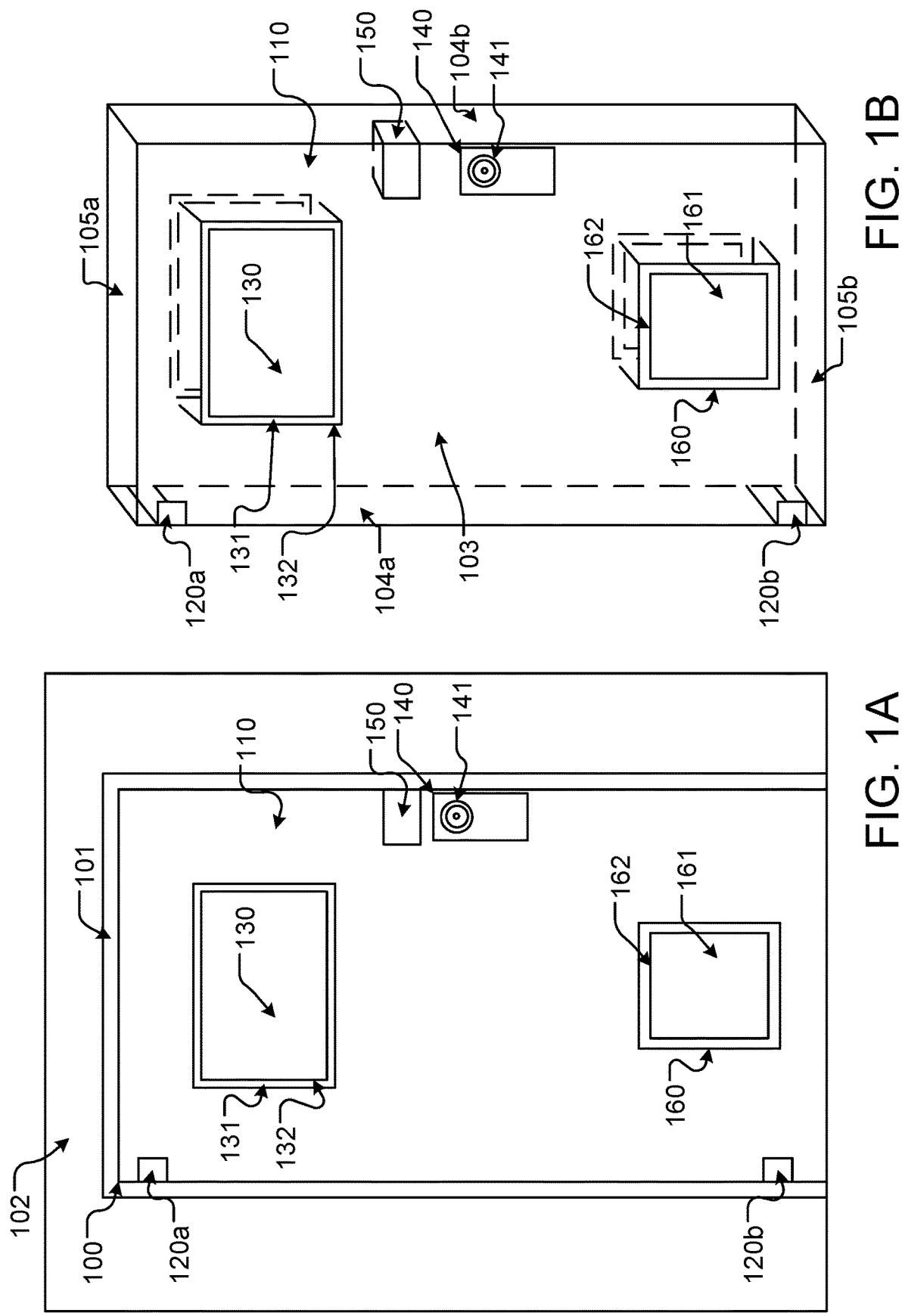

NEGATIVE POISSON'S RATIO MATERIALS FOR DOORS AND WINDOWS

BACKGROUND

The present disclosure relates generally to materials for doors, windows, and related accessories.

SUMMARY

We describe here doors, windows, and their related accessories/hardware, that include materials that exhibit a negative Poisson's ratio. NPR doors and windows can absorb energy efficiently, thereby exhibiting greater tensile strength, flexibility, impact resistance, and durability than comparable doors and windows with a positive Poisson's ratio.

In an aspect, the door includes a rectangular panel having a first face, a second face, and two pairs of opposing edges, in which the edges of each pair of edges are parallel and in which a first pair of edges is longer than a second pair of edges. The rectangular panel includes a layered composite material, that has a first layer of the composite material has a positive Poisson's ratio (PPR) and a second layer of the composite material is disposed in contact with the first layer and includes a material having a negative Poisson's ratio (NPR). The door includes a hinge including plates joined together by a joint, in which a first one of the plates is attached to a first one of the edges of the first pair of edges and in which a second one of the plates extends beyond the first one of the edges. The door includes a handle opening defined through a thickness of the rectangular panel.

Embodiments of the door can include one or any combination of two or more of the following features.

The first layer of the composite material and the second layer of the composite material are disposed parallel to the first face of the door. The first layer of the composite material and the second layer of the composite material are disposed perpendicular to the first face of the door. The composite material includes a third layer having a positive Poisson's ratio, in which the second layer including the NPR material is disposed between the first layer and the third layer of the composite material. In some embodiments, the door includes a cover having a positive Poisson's ratio, the cover extending over the first face, the second face, and both pairs of opposing edges of the rectangular panel.

The second layer of the composite material comprises an NPR foam. The second layer of the composite material includes a re-entrant foam structure. The NPR foam has a characteristic dimension of between 0.1 μm and 3 mm. The second layer of the composite material comprises a metal, ceramic, or polymer having a negative Poisson's ratio.

The plates of the hinge include an NPR material. In some embodiments, the plates of the hinge include an NPR-PPR composite material. The plates of the hinge include an NPR metal foam. The door includes a window opening is defined through the thickness of the rectangular panel. The door includes a window disposed in the window opening and a seal disposed around edges of the window opening, in which the seal includes an NPR material. The window includes an NPR material. The window includes an NPR ceramic foam that is transparent to visible light. The door of claim 13, in which the seal includes an NPR polymer foam.

The door includes a lock at least partially disposed in an interior of the rectangular panel, in which the lock includes an NPR material. The lock of the door includes a cylinder and spring-loaded pins configured to engage with the cylinder to prevent the cylinder from turning, and the cylinder, the pins, or both include an NPR material. The door includes a latch that includes a face plate disposed on the first one of the edge of the first set of edges, and a bolt disposed in an interior of the rectangular panel and configured to extend beyond the first one of the edges of the first set of edges, where the face plate, the bolt, or both include an NPR material. In some embodiments, the face plate, the bolt, or both include an NPR metal foam. The door includes a doorknob disposed in the handle opening, in which the doorknob includes an NPR material. The doorknob includes an NPR metal foam or an NPR polymer foam.

In an aspect, a handle for a door includes a latch including a planar faceplate a bolt configured to extend and retract through an opening defined through the faceplate, a door knob, and a spindle that connects the door knob to the latch, in which the spindle includes an NPR material. In some embodiments, the spindle includes an NPR metal foam. The bolt includes an NPR metal foam.

Other implementations are within the scope of the claims.

DESCRIPTION OF DRAWINGS

FIGS. 1A and 1B are front and perspective illustrations, respectively, of a door.

DETAILED DESCRIPTION

Figure 2A:
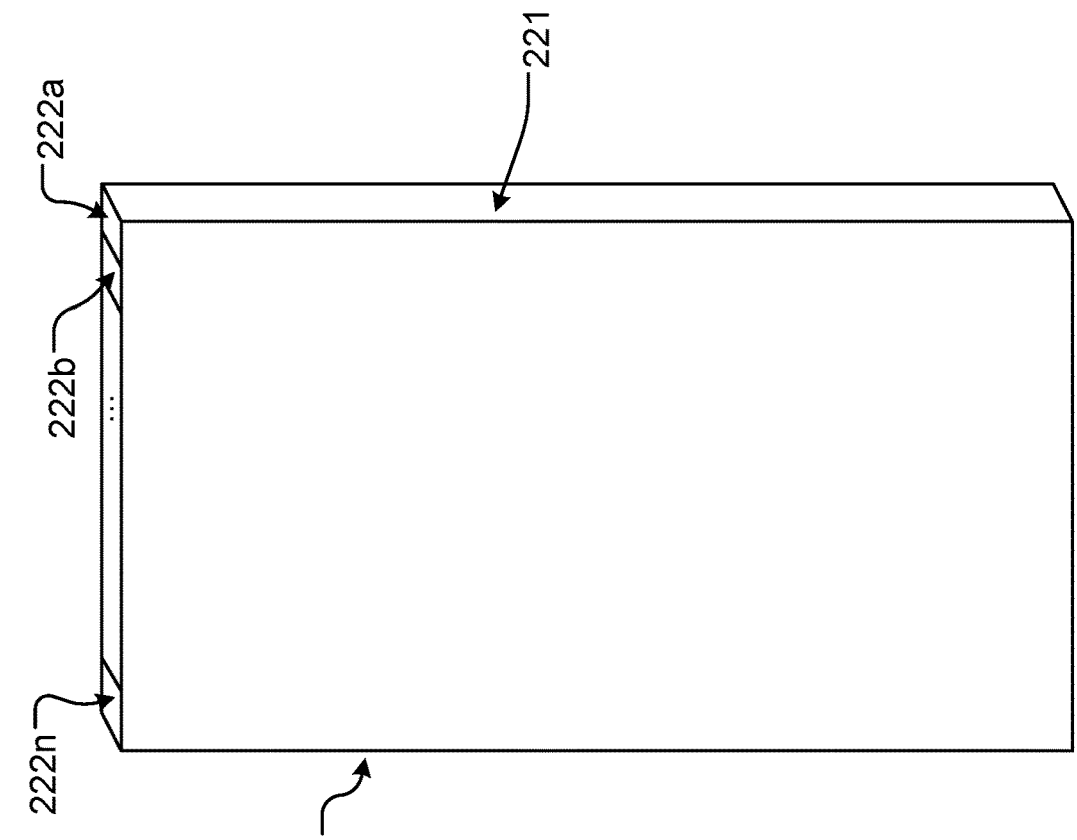
FIGS. 2A and 2B are illustrations of doors.

We describe here doors that include materials that exhibit a negative Poisson's ratio ("NPR doors"). NPR doors can absorb energy efficiently, thereby exhibiting greater tensile strength, flexibility, impact resistance, and durability than comparable doors and windows made from only materials with a positive Poisson's ratio ("PPR doors").

FIG. 1A and FIG. 1B illustrate an NPR door 100 that is formed at least in part from NPR material (an "NPR door"). A rectangular panel 110 forms the main body of the door 100. In the illustrated example, a door frame 101 is mounted on a wall 102 and provides support in between the door 100 and the wall 102.

The rectangular panel 110 has a front face 103, back face (not shown), and two pairs of opposing edges, in which the edges of each pair of the edges are parallel. A first pair of side edges 104a and 104b are oriented vertically when the door 100 is mounted in the door frame 101, and a second pair of top/bottom edges 105a and 105b are oriented horizontally. The side edges 104a and 104b are longer than the top/bottom edges 105a and 105b. A typical example of rectangular panel 110 is approximately 80" tall×36" wide×2" deep in size but can vary in any or all dimensions.

Figure 2B:
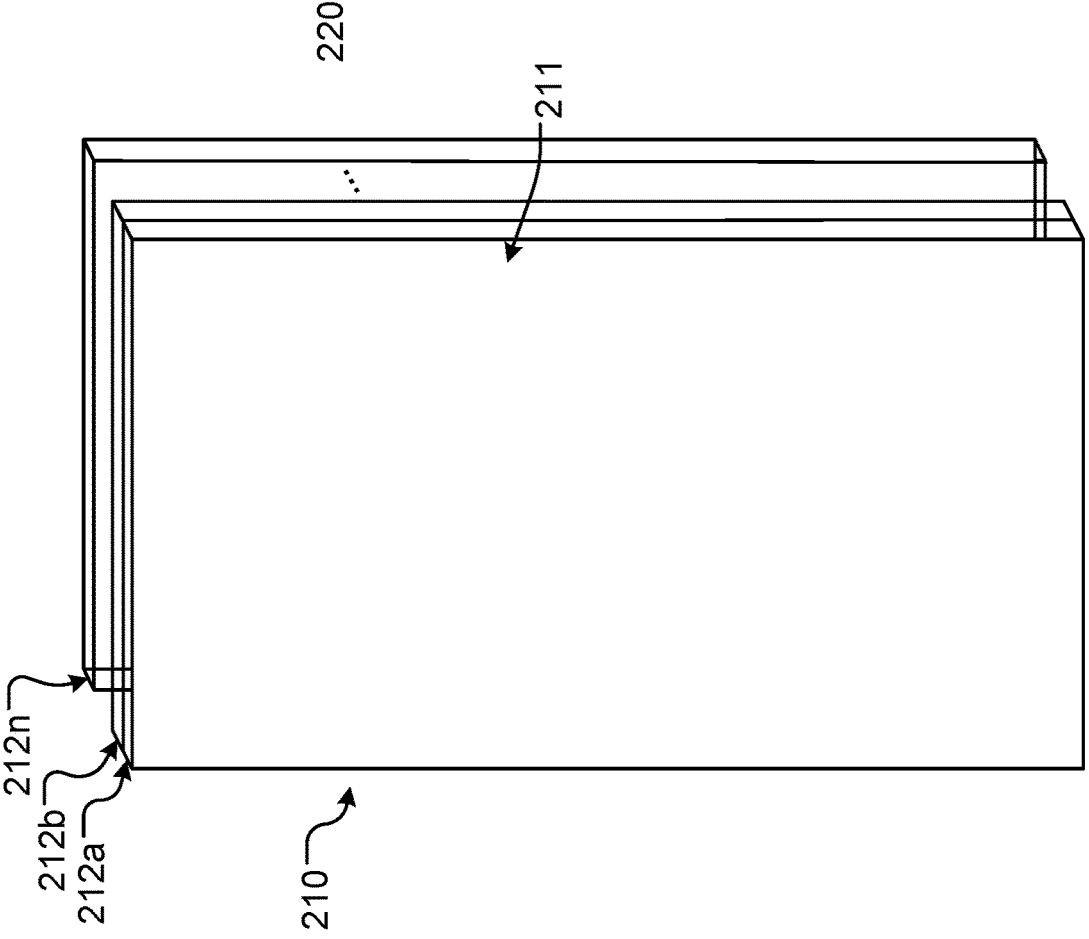

In some examples, the rectangular panel 110 is a multi-layer composite structure that includes layers of a negative Poisson's ratio (NPR) material and layers of a positive Poisson's ratio (PPR) material, as discussed further with respect to FIGS. 2A-2B. In some examples, the rectangular panel 110 is a matrix composite material composed of inclusions of NPR material in a PPR matrix, or inclusions of PPR material in an NPR matrix. The NPR material can be an NPR foam, such as an NPR metal foam, an NPR ceramic foam, or an NPR polymer foam.

An NPR material is a material that has a Poisson's ratio that is less than zero, such that when the material experiences a positive strain along one axis (e.g., when the material is stretched), the strain in the material along the two perpendicular axes is also positive (e.g., the material expands in cross-section). Conversely, when the material experiences a negative strain along one axis (e.g., when the material is compressed), the strain in the material along a perpendicular axis is also negative (e.g., the material compresses along the perpendicular axis). By contrast, a material with a positive Poisson's ratio (a "PPR material") has a Poisson's ratio that is greater than zero. When a PPR material experiences a positive strain along one axis (e.g., when the material is stretched), the strain in the material along the two perpendicular axes is negative (e.g., the material compresses in cross-section), and vice versa.

A window opening is defined through a thickness of the rectangular panel 110, and a window 130 is disposed in the window opening. A window frame 131 is disposed around the edge of the window opening to secure the window 130 into the window opening. A seal 132 secures the window 130 in place in the window frame 131. The window seal 132 also helps to prevent unwanted particles (e.g. dust, pollen, rain, etc.) or noise transferring from one side of the rectangular panel 110 to the other side, e.g., via small openings that would otherwise be present between the window 130 and the window frame 131. In some examples, only the window frame 131 or only the seal 132 is used to secure the window 130 in the window opening.

Hinges 120a and 120b (collectively referred to as hinges 120) are attached to the side edge 104a of the rectangular panel 110 and attach the rectangular panel 110 to the door frame 101. In some examples, a single hinge is used to attach the rectangular panel 110 to the door frame 101. The hinges 120a and 120b allow the door 100 to swing open and closed relative to the door frame 101. In some examples, other attachments are used to attach the rectangular panel 110 to the door frame 101, a wheel and track assembly for a sliding door.

A handle 140 attached adjacent to the side edge 104b extends outward from the front face 103 of the rectangular panel 110 and through a handle opening defined through the thickness of rectangular panel 110. The handle 140 includes a door knob 141, which is rounded in the illustrated example but can be another suitable shape.

In the illustrated example, a lock 150 is a separate component located above the handle 140 but in some examples, the handle and the lock are an integral component. The lock 150 is disposed in the interior of the rectangular panel 110 and configured to extend beyond the side edge 104b of the panel when engaged. The lock 150 secures the door 100 to the door frame 101.

A pet flap opening is defined through the thickness of the rectangular panel 110, with a pet flap frame 160 attached to the interior edges of the pet flap opening. A pet flap 161 is attached to the pet flap frame 160 along one edge and disposed within the pet flap opening. The pet flap 161 can swing open responsive to pressure, e.g., when an animal walks through the pet flap.

In some examples, one or more other components of the door 100, such as the hinges 120, the window 130 or window frame 131, the handle, or the lock 150, is formed at least in part from an NPR material.

The presence of NPR material in the door 100 can contribute to desired performance characteristics, such as energy absorption (e.g., mechanical, electrical, magnetic, optical, or acoustic energy), tensile strength, flexibility, impact resistance, durability, low density, high porosity, etc. For example, a door including NPR material can absorb energy from impacts or applied forces, e.g., earthquakes, for instance, absorbing compressive forces both vertically and laterally. Additionally, NPR materials have a lower density than PPR materials, e.g., than PPR materials of a similar composition or than PPR materials having similar mechanical properties, and NPR doors can thus be lighter in weight than otherwise comparable doors that include only PPR materials ("PPR doors"). Furthermore, NPR doors can absorb acoustic energy more efficiently compared to PPR doors, providing effective soundproofing, e.g., for music rehearsal, sound recording, or film-making spaces, etc. Additionally, because NPR materials can have lower coefficients of thermal expansion than comparable PPR materials, NPR doors can undergo less thermal shrinkage or expansion than comparable PPR doors. In some examples, the composition and/or proportion of NPR and PPR materials in an NPR door is selected such that the NPR door has an overall coefficient of thermal expansion that is near zero, e.g., between −0.1 and 0.1, such that the NPR door substantially does not change in size or shape with exposure to thermal variations.

In a specific example, an NPR door can be used in place of a heavy, conventional door such as a fire door or a strong security door such as an exterior door. The NPR door can be lighter than the conventional counterpart while still fitting snugly into the door frame, e.g., preventing wind, sand, or heat/cold from seeping inside via spaces between the door and the frame. Additionally, because NPR doors have a low coefficient of thermal expansion, e.g., lower than that of comparable PPR doors, NPR doors can remain snugly fit within the door frame even in the face of temperature variations.

In some examples, the composition and/or proportion of NPR and PPR materials in an NPR door is selected such that the NPR door as a whole has Poisson's ratio of close to zero (referred to as "zero Poisson's ratio behavior" or "ZPR behavior"), e.g., a Poisson's ratio of between about −0.1 and about 0.1. For instance, the NPR and PPR materials can be selected such that responsive to an applied compressive force, the NPR materials contract laterally by substantially the same amount as the amount by which the PPR materials expand.

NPR materials can include NPR foam materials, such as an NPR ceramic foam, an NPR polymer foam, or an NPR metal foam. NPR ceramic foams include foams of clay, sand, lime, or other suitable ceramics. NPR polymer foams include NPR thermoplastic polymer foams (e.g., polyester polyurethane or polyether polyurethane) or NPR viscoelastic elastomer foams. NPR metal foam include foams of metals such as steel, stainless steel, titanium, aluminum, brass, or other metals, or alloys thereof. A foam is a multi-phase composite material in which one phase is gaseous and the one or more other phases are solid (e.g., polymeric, ceramic, or metal). Foams can be closed-cell foams, in which each gaseous cell is sealed by solid material; open-cell foams, in which the each cell communicates with the outside atmosphere; or mixed, in which some cells are closed and some cells are open.

In some examples, some or all of the components of an NPR door are formed of an NPR-PPR composite material that includes both an NPR material (e.g., an NPR foam material) and a PPR material. NPR-PPR composite materials are discussed further below.

In some examples, an inner portion (e.g., a core) of a rectangular panel of an NPR door includes an NPR material (e.g., is formed of an NPR material or an NPR-PPR composite material), and a cover having a positive Poisson's ratio is disposed on all exterior surfaces of the door such that the NPR material of the core is not exposed to the environment. This configuration can provide some of the benefits of an NPR material while also achieving benefits, such as durability, water resistance, or hardness, provided by the PPR cover. In some examples, an inner layer or core of a rectangular panel 110 is a PPR material and the covering includes an NPR material (e.g., is formed of an NPR material or an NPR-PPR composite material).

An example of an NPR foam structure is a re-entrant structure, which is a foam in which the walls of the cells are concave, e.g., protruding inwards toward the interior of the cells. In a re-entrant foam, compression applied to opposing walls of a cell will cause the four other, inwardly directed walls of the cell to buckle inward further, causing the material in cross-section to compress, such that a compression occurs in all directions. Similarly, tension applied to opposing walls of a cell will cause the four inwardly directed walls of the cell to unfold, causing the material in cross-section to expand, such that expansion occurs in all directions. NPR foams can have a Poisson's ratio of between $-0.5$ and 0, e.g., $-0.5$, $-0.4$, $-0.3$, $-0.2$, or $-0.1$. NPR foams can have an isotropic Poisson's ratio (e.g., Poisson's ratio is the same in all directions) or an anisotropic Poisson's ratio (e.g., Poisson's ratio when the foam is strained in one direction differs from Poisson's ratio when the foam is strained in a different direction).

In some examples, the rectangular panel (e.g., the rectangular panel 110) of an NPR door is a composite of NPR material and PPR material, e.g., a layered composite. FIGS. 2A-2B show example rectangular panels having layered composite structures including layers of NPR and PPR materials.

FIG. 2A illustrates an example rectangular panel 210 for an NPR door having a layered composite structure that is formed of n alternating layers 212a-212n (collectively referred to as layers 212) of PPR and NPR material oriented parallel to a front face 211 of the rectangular panel 210. If the layer 212a that forms the front face 211 of the rectangular panel 210 is a PPR material, the adjacent layer 212b is an NPR material, with subsequent layers alternating between PPR and NPR such that no two consecutive layers are made of the same type of material. If the first layer 212a is an NPR material, the adjacent layer 212b is a PPR material. In some examples, the first layer 212a that forms the front face 211 of the rectangular panel 210 is the same type of material as the last layer 212n that forms the back face (not shown), e.g., both layers 212a and 212n are PPR material, or both layers are NPR material. In some examples, the layers 212a and 212n are formed of different types of materials. In some examples, multiple compositions of PPR materials, NPR materials, or both, are used, and in the layered composite structure, there can be, e.g., two adjacent layers of the same type (e.g., two adjacent PPR layers or two adjacent NPR layers) of different composition.

FIG. 2B illustrates an example rectangular panel 220 for a door (e.g., door 100, referring to FIG. 1A) having a composite structure that is formed of n alternating layers 222a-222n (collectively referred to as layers 222) of PPR and NPR material oriented parallel to a side edge 221 of the rectangular panel 220. If the layer 222a that forms the side edge 221 of the rectangular panel 220 is a PPR material, the adjacent layer 222b is an NPR material, with subsequent layers alternating between PPR and NPR such that no two consecutive layers are made of the same type of material. If the first layer 222a is an NPR material, the adjacent layer 222b is a PPR material. In some examples, the first layer 222a that forms one side edge of the rectangular panel 220 is the same type of material as the last layer 222n that forms the opposite side edge, e.g., both layers 222a and 222n are PPR material, or both layers are NPR material. In some examples, the layers 222a and 222n are formed of different types of materials. In some examples, multiple compositions of PPR materials, NPR materials, or both, are used, and in the layered composite structure, there can be, e.g., two adjacent layers of the same type (e.g., two adjacent PPR layers or two adjacent NPR layers) of different composition.

The number of layers n in the rectangular panels 210, 220 can be any suitable number, e.g., between 3 and 100 layers. In some examples, such as when the number of layers 222 is small, e.g., less than 10, the layers 222 can be laminated together to form the rectangular panel 220. In some examples, such as when the number of layers 222 is large, a composite NPR-PPR material can be formed, e.g., NPR-PPR composites and subsequently formed, e.g., by machining, into the shape of the rectangular panel.

NPR-PPR composite materials are composites that include both regions of NPR material and regions of PPR material. NPR-PPR composite materials can be laminar composites (also referred to as multilayer composites or layered composites), matrix composites (e.g., metal matrix composites, polymer matrix composites, or ceramic matrix composites), particulate reinforced composites, fiber reinforced composites, or other types of composite materials. In some examples, the NPR material is the matrix phase of the composite and the PPR material is the reinforcement phase, e.g., the particulate phase or fiber phase. In some examples, the PPR material is the matrix phase of the composite and the NPR material is the reinforcement phase.

An NPR door formed from an NPR-PPR composite material has advantages provided by both the NPR material and the PPR material. For instance, the NPR material contributes advantages such as impact resistance and low density, while the PPR material contributes advantages such as environmental resistance. In an example, the NPR-PPR composite material of an NPR door can be covered by a cover having a positive Poisson's ratio that disposed on all exterior surfaces of the door, such that the NPR material is not exposed to the environment. In this arrangement, the NPR material provides impact resistance and low density, while the non-porous PPR material protects the NPR material from coming into contact with the environment. Moreover, by tuning the relative volumes of the NPR and PPR materials in an NPR-PPR composite, a composite material can be achieved that, when subject to an applied external stress or strain, does not change size in any dimension. This configuration provides robust mechanical stability to the door, e.g., in the face of severe impact or stress.

Figure 3:
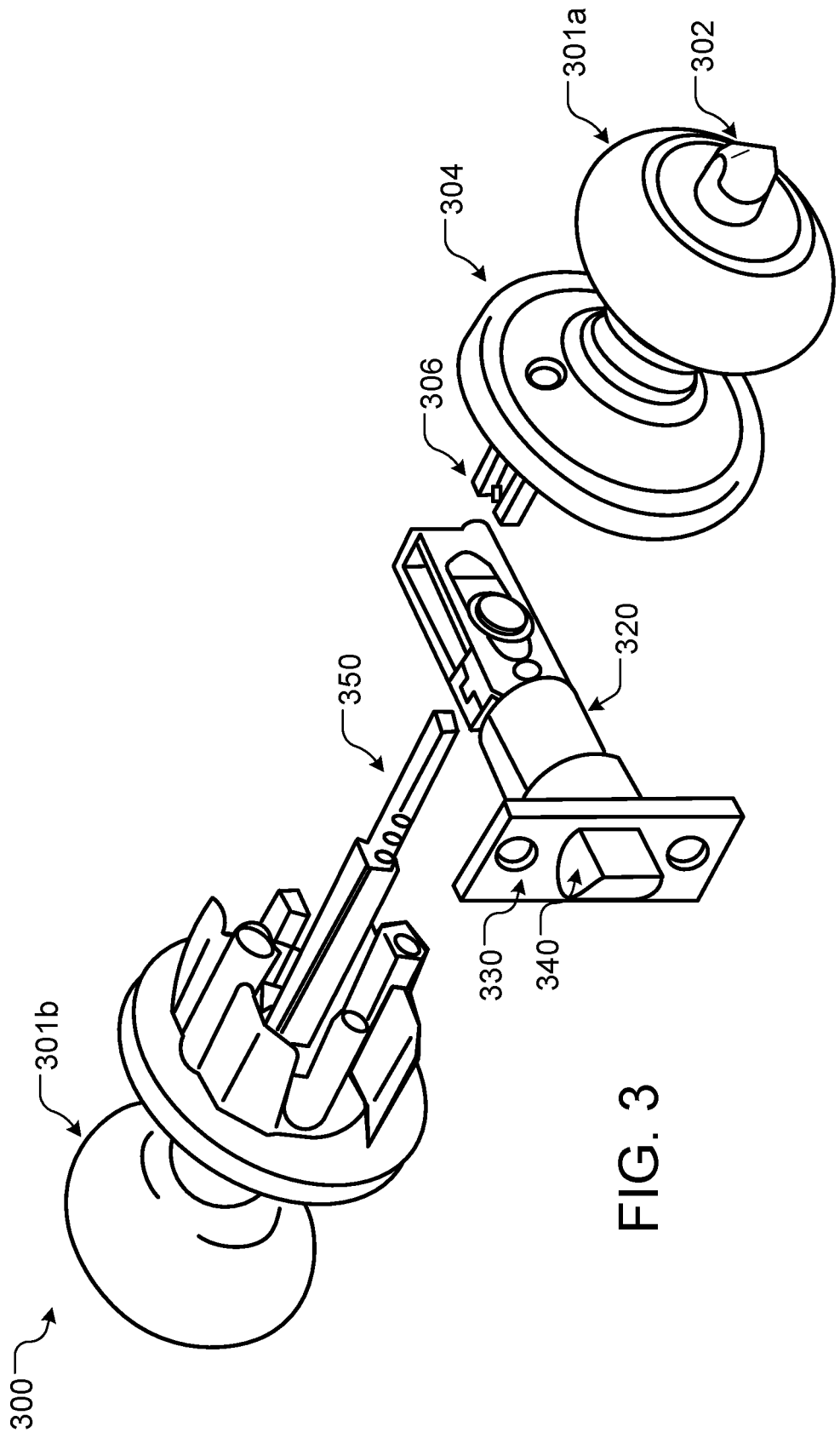
FIG. 3 is an illustration of a door handle.

Referring to FIG. 3, in some examples, an NPR door can include an NPR handle 300 that includes an NPR material, such as an NPR foam (e.g., an NPR metal foam or an NPR polymer foam) or an NPR-PPR composite material. The illustrated handle 300 includes rounded door knobs 301a and 301b that can be turned to open the door. In some examples, the handle 300 can include a different type of opening mechanism (e.g. lever, pull) which allows force to be applied to open or close the door 100.

The door knob 301a has a turnkey 302 protruding from the center of the door knob 301a; the door knob 301b does not contain a turnkey. The turnkey 302 is a button that when pressed or turned, engages a latch assembly 320 to secure the door into the wall or door frame. In some examples, both of the door knobs 301a and 301b contain a corresponding turnkey or other locking mechanism. In some examples, neither of the door knobs 301a and 301b contains a corresponding turnkey or other locking mechanism. In some examples, the latch assembly 320 is engaged (e.g., locked or unlocked) using a variety of mechanisms other than a turnkey, e.g., a key, keypad, fingerprint sensor, etc.

The latch assembly 320 includes a face plate 330 and a bolt 340. The face plate 330 is positioned flush with the side edge of the door. When the latch assembly 320 is engaged, the bolt 340 protrudes outward from the latch assembly 320 into the door jamb of the door frame or into the wall. When the latch assembly 320 is not engaged, the bolt 340 is retracted into the interior of the latch assembly 320.

A spindle 350 is connected to the door knob 301b and to a shank 306 that protrudes from the door knob 301a. When a rotational force is applied to one of the door knobs 301a, 301b (e.g., when the door knob is turned), the spindle 350 engages with the latch assembly 320, retracting the bolt 340 and allowing the door 100 to be opened. In some examples, the bolt 340 uses a spring to retract or extend from the latch assembly 320.

The bolt 340 has a slanted face that allows the door to be secured in the door frame or wall by applying a pushing force instead of a turn force onto the door knobs 310a or 310b. In some examples, the bolt 340 contains a deadlatch (not shown), which serves a secondary latch to the latch assembly 320 and remains held into the door frame when the bolt 340 is extends into the door frame. The deadlatch provides additional security by preventing the bolt 340 from being dislodged.

A rose 304 is positioned between each door knob 301a, 301b and the latch assembly 320 to obscure the latch assembly 320 from view when installed in a door. In some examples, a strike plate is attached to the side edge of the door to reinforce the latch assembly 320, helping to prevent unwanted dislodging of the latch assembly 320.

One or more components of the NPR handle 300 includes an NPR material, e.g., is formed of an NPR material, such as an NPR foam (e.g., an NPR metal foam or an NPR polymer foam) or an NPR-PPR composite material. For instance, the face plate 330, the bolt 340, the spindle 350, and/or the door knobs 301a, 301b can include an NPR material. The use of an NPR material for the face plate 330 and the bolt 340 can reduce friction between the face plate 330 and bolt 340, decreasing the risk of jamming (e.g., inability to turn the handle and close or open the door). Door knobs 301a and 301b including an NPR material can absorb greater impacts than a handle or door knob formed of PPR material without being damaged or deformed. Additionally, the use of NPR material in components of a door handle can provide structural integrity in extreme temperatures (e.g. freezing temperatures, exposed flames), e.g., which can be advantageous in cases of emergency. Furthermore, an NPR is lighter than a comparable handle containing only PPR material, and requires less force to operate.

Figure 4:
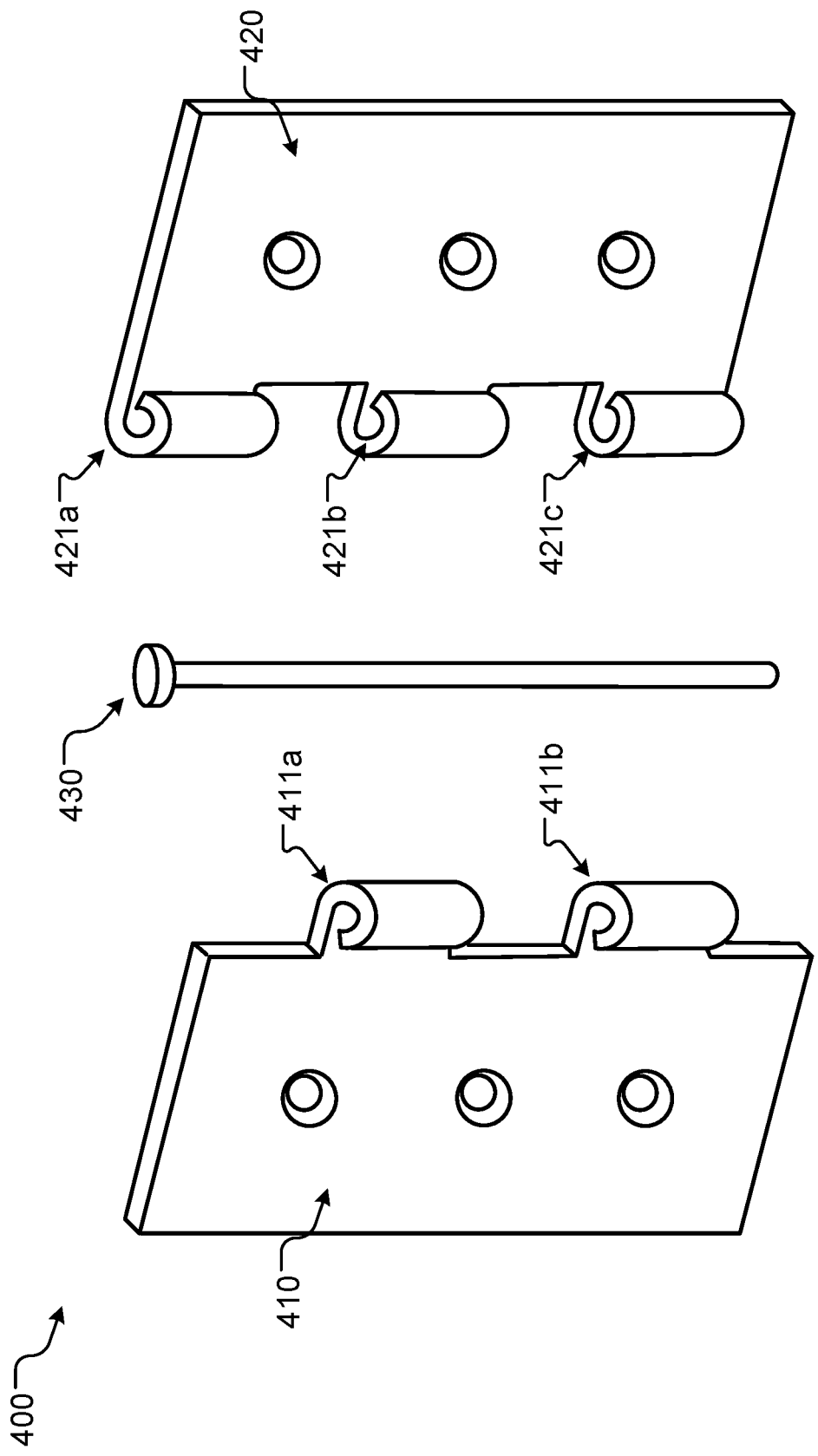
FIG. 4 is an illustration of a door hinge.

Referring now to FIG. 4, in some examples, an NPR door can include one or more NPR hinges 400 that include an NPR material, such as an NPR foam (e.g., an NPR metal foam or an NPR polymer foam) or an NPR-PPR composite material. Each NPR hinge 400 includes a pair of leafs 410 and 420. The illustrated leafs 410 and 420 are rectangular plates, but can also have other shapes. The leaf 420 attaches to the side edge 104a of the rectangular panel 110 of the door (referring to FIG. 1B), and the other leaf 410 extends beyond the edge 104a to attach to the door frame 101. In some implementations, the leafs 410 and 420 can be configured to attach the door 100 to door frame 101 in different ways depending on the hinge, e.g., a flush hinge attaches to the front face of a rectangular panel of an example door 100.

Each leaf 410 and 420 of the hinge 400 has hollow, generally cylindrical protrusions, known as knuckles 411a-411b and 421a-421c. In the illustrated example, the leaf 410 has two protrusions and the leaf 420 has three protrusions; other numbers of protrusions are also possible. In some examples, the leafs 410 and 420 have the same number of knuckles. The hinge 400 is secured by interlocking the knuckles 411a-411b of the leaf 410 with the knuckles 421a-421c of the leaf 420 and placing a cylindrical pin 430 inside the interlocked knuckles 411a-411b and 421a-421c.

In some examples, the leafs 410 and 420 (e.g., including the knuckles), pin 430, or both, of the hinge 400 includes NPR materials. For instance, the leafs 410 and 420, pin 430, or both are formed of an NPR material or an NPR-PPR composite material. A hinge that includes NPR materials is lighter and can have less resistance between components of the hinge (e.g. friction) and therefore reduce unwanted noise (e.g. squeaking), compared to a hinge including only PPR material.

Although example hinge 400 as leafs 410 and 420 joined together by interlocking their respective knuckles 411a-411b and 421a-421c secured by a pin 430, other examples of hinges (e.g., ball-bearing, piano, pivot, offset, flush etc.) can also include NPR or NPR-PPR composite materials. In some examples, the leafs 410 and 420 are joined to form a single component, e.g., the leafs 410 and 420 are welded together or fabricated as a single component.

Referring again to FIG. 1A, in some examples, the window frame 131, which secures the window 130 in place, includes an NPR material, e.g., is formed of an NPR material or an NPR-PPR composite material. The window seal 132 is a flexible, ductile material, e.g., a polymer. In some examples, window seal 132 includes an NPR material, e.g., is formed of an NPR material, such as an NPR foam material (e.g., an NPR polymer foam) or an NPR-PPR composite material, in addition to or instead of the window frame 131 including an NPR material.

The use of an NPR material for the window frame 131, window seal 132, window 130 or any combination thereof, can have advantages. For instance, the window frame 131 formed of an NPR material can absorb greater impacts than a window frame formed of PPR material. The use of NPR material in a window seal 132 can provide better temperature insulation for a door 100 and reduce the transmissibility of particulates (e.g. dust, pollen, etc.) or precipitation (e.g. snow, rain, hail, etc.) through any potential gaps between the window 130 and the window opening 131. The use of NPR material in a window seal 132 can provide robust shock absorbance (e.g. sound isolation) compared to a window sealant including only PPR material. The use of NPR material in a window 130 can provide improved scratch-resistance and durability compared to a window including only PPR material.

In some examples, a window opening is defined through a thickness of a wall (e.g. wall 102) or other structure (e.g., vehicle wall, ceiling, etc.). A window 130 is disposed in the window opening. A window frame 131 is disposed around the edge of the window opening to secure the window 130 into the opening of the wall 102. A window sealant 132 secures the window 130 in place in the window frame 131. Such window frames, window sealants, or both can include an NPR material, e.g., can be formed of an NPR material or an NPR-PPR composite material.

Figure 5A:
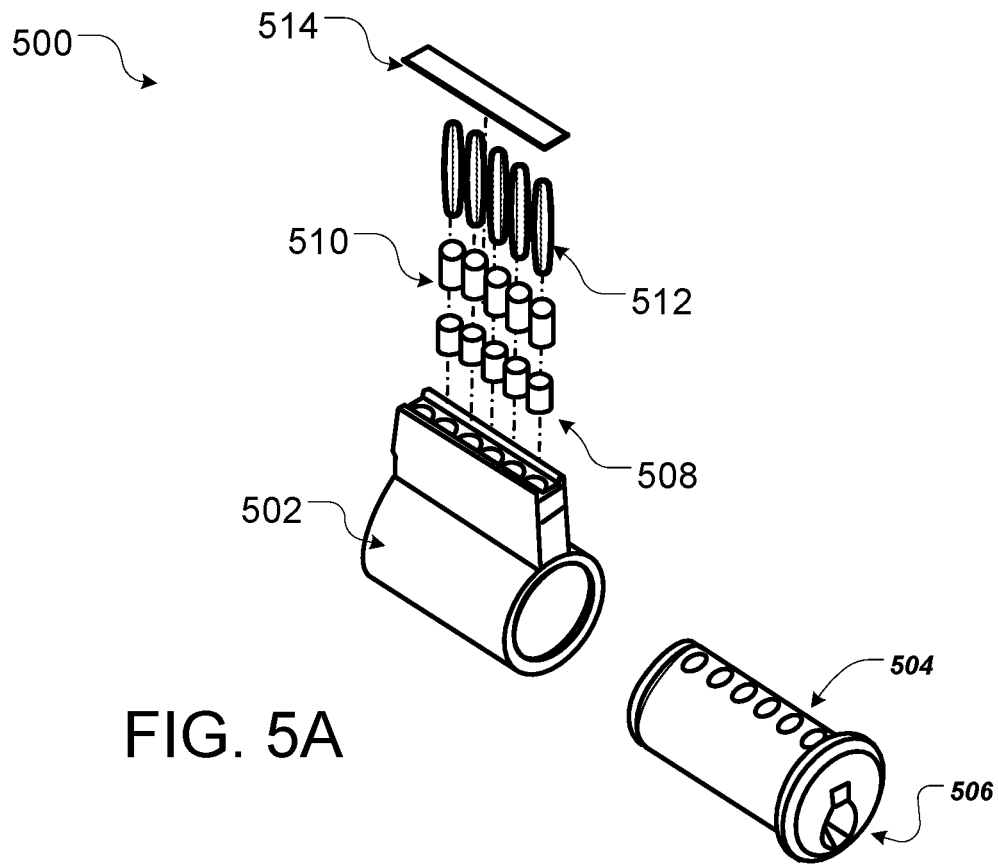
FIGS. 5A and 5B are illustrations of a door lock.
Figure 5B:
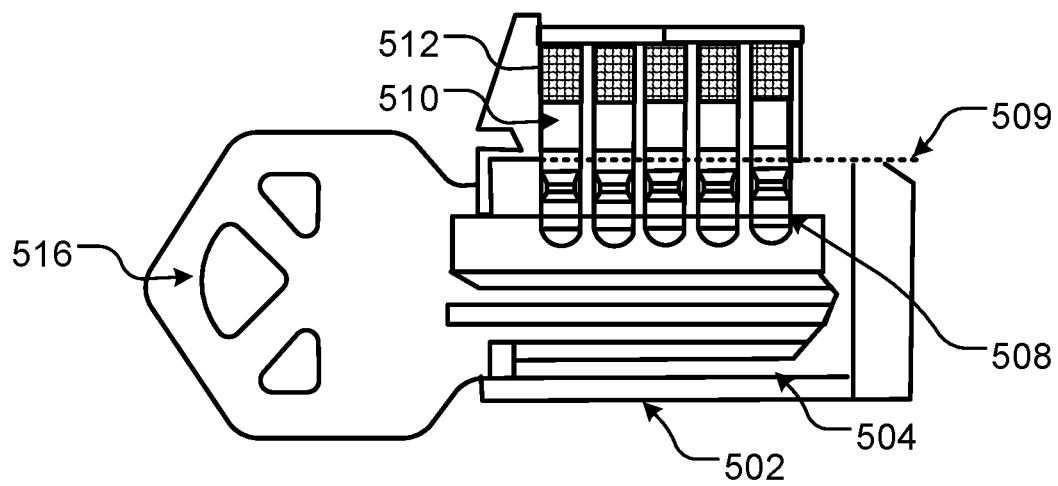

Referring to FIGS. 5A and 5B, in some examples, an NPR door can include a door lock that includes an NPR material, such as an NPR foam (e.g., an NPR metal foam or an NPR polymer foam) or an NPR-PPR composite material. An example NPR door lock 500 with an example pin and tumbler system is shown in an exploded view (FIG. 5A) and a cross-section view (FIG. 5B). The pin and tumbler system of the door lock 500 includes a cylindrical housing 502, a plug 504, key pins 508, driver pins 510, and springs 512, and a key slot 506 for operating the door lock 500.

The cylindrical housing 502 is an outer shell that contains the plug 504 of the pin and tumbler system. The plug 504 is a cylinder shaped component inside of the cylindrical housing 502 that can be rotated by a key inserted into the key slot 506 to engage or disengage the door lock 500. Referring to FIG. 5B, when a correctly shaped key 516 (e.g., a key with bitting or cavities that are cut to match a combination pattern) is inserted in the key slot 506 and rotated, the key 516 engages with the key pins 508, thereby rotating the plug 504 to disengage (e.g. unlock) the door lock 500.

The combination pattern describes a spatial displacement of key pins 508 and springs 512, in which the springs 512 are compressed to align the driver pins 510, key pins 508, and the cavities or bitting of the key 516 to clear a sheer line 509. Once the key pins 508 and drive pins 510 are aligned into a correct pattern, the sheer line 509 is cleared and allows the plug 504 to be turned, disengaging the lock from the door frame. When the sheer line 509 is cleared and the plug 504 is turned, a bolt is retracted from an opening defined through a door frame and the door is unlocked. The cylindrical housing 502 also contains a spring cover 514 to cover the components inside of the cylindrical housing 502, e.g. the springs 512.

The use of NPR material for components of a door lock 500 can have numerous advantages. For instance, lock components including an NPR material can have reduced friction between various components of the lock as compared to comparable PPR-only locks, decreasing the risk of jamming. Additionally, the use of NPR material in door lock can provide structural integrity in extreme temperatures (e.g. freezing temperatures, exposed flames), e.g., which can be advantageous in cases of emergency. Furthermore, an NPR lock or lock interior is lighter than a comparable lock containing only PPR materials, and requires less force to operate.

Referring again to FIG. 1A, in some examples, the pet flap frame 160 includes an NPR material, e.g., an NPR-PPR composite material. Moreover, an adhesive or hinge that secures the pet flap 161 to the pet flap frame 160 also can include an NPR material.

Figure 6:
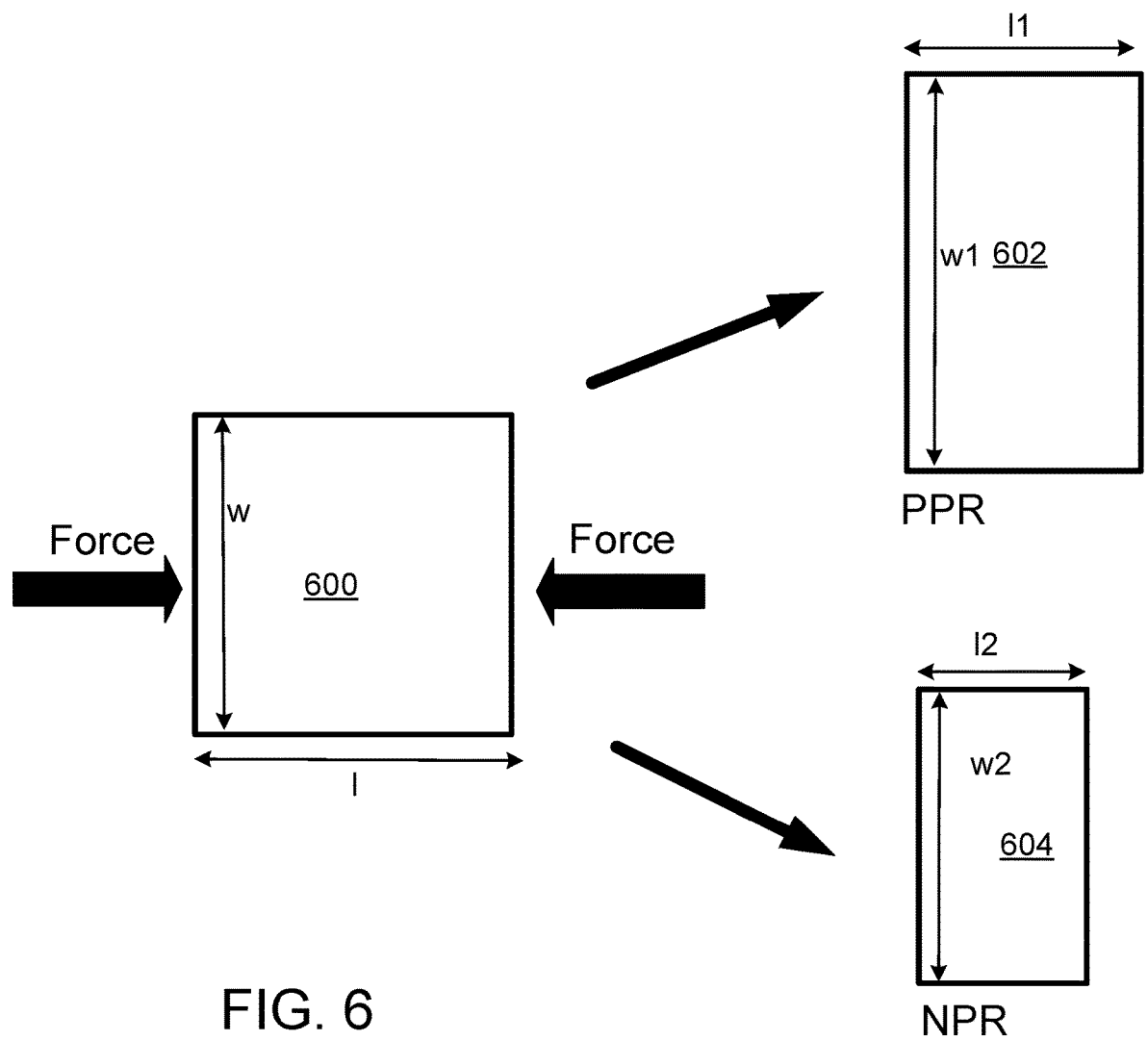
FIG. 6 is an illustration of materials with negative and positive Poisson's ratios.

More materials with negative and positive Poisson's ratios are illustrated in FIG. 6, which depicts a hypothetical two-dimensional block of material 600 with length l and width w.

If the hypothetical block of material 600 is a PPR material, when the block of material 600 is compressed along its width w, the material deforms into the shape shown as block 602. The width w1 of block 602 is less than the width w of block 600, and the length l1 of block 602 is greater than the length l of block 600: the material compresses along its width and expands along its length.

By contrast, if the hypothetical block of material 600 is an NPR material, when the block of material 600 is compressed along its width w, the material deforms into the shape shown as block 604. Both the width w2 and the length l2 of block 604 are less than the width w and length l, respectively, of block 600: the material compresses along both its width and its length.

NPR materials for doors can be foams, such as polymeric foams, ceramic foams, metal foams, or combinations thereof. A foam is a multi-phase composite material in which one phase is gaseous and the one or more other phases are solid (e.g., polymeric, ceramic, or metal). Foams can be closed-cell foams, in which each gaseous cell is sealed by solid material; open-cell foams, in which the each cell communicates with the outside atmosphere; or mixed, in which some cells are closed and some cells are open.

An NPR foam can be polydisperse (e.g., the cells of the foam are not all of the same size) and disordered (e.g., the cells of the foam are randomly arranged, as opposed to being arranged in a regular lattice). An NPR foam can be a cellular structure having a characteristic dimension (e.g., the size of a representative cell, such as the width of the cell from one wall to the opposing wall) ranging from 0.1 μm to about 3 mm, e.g., about 0.1 μm, about 0.5 μm, about 1 μm, about 10 μm, about 50 μm, about 100 μm, about 500 μm, about 1 mm, about 2 mm, or about 3 mm.

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

NPR-PPR composite materials are composites that include both regions of NPR material and regions of PPR material. NPR-PPR composite materials can be laminar composites, matrix composites (e.g., metal matrix composites, polymer matrix composites, or ceramic matrix composites), particulate reinforced composites, fiber reinforced composites, or other types of composite materials. In some examples, the NPR material is the matrix phase of the composite and the PPR material is the reinforcement phase, e.g., the particulate phase or fiber phase. In some examples, the PPR material is the matrix phase of the composite and the NPR material is the reinforcement phase.

NPR materials can exhibit various desirable properties, including high shear modulus, effective energy absorption, and high toughness (e.g., high resistance to indentation, high fracture toughness), among others. The properties of NPR materials are such that a door or window that includes an NPR material (an "NPR door" or an "NPR window", respectively) undergoes a different (e.g., smaller) change in dimension when absorbing energy than a comparable door or window formed of only PPR material (a "PPR door" or a "PPR window", respectively).

The compressibility of a door or window affects the elastic deformation (e.g., compression) experienced by the door or window when it absorbs energy from impacts. A suitable amount of deformation enables core of the door or window to expand and compress to maintain the integrity of the door or window. A highly deformable door or window will have a large amount deformation when absorbing impact and may be inefficient in supporting compressive loads (e.g., supporting the weight of a roof on a building). To design a door or window that is capable of efficiently absorbing impact, the material of the door or window can be selected to balance rigidity and elasticity. NPR materials can be incorporated into the door or window to provide a desired deformability (e.g., rigidity) and strength.

Figure 7:
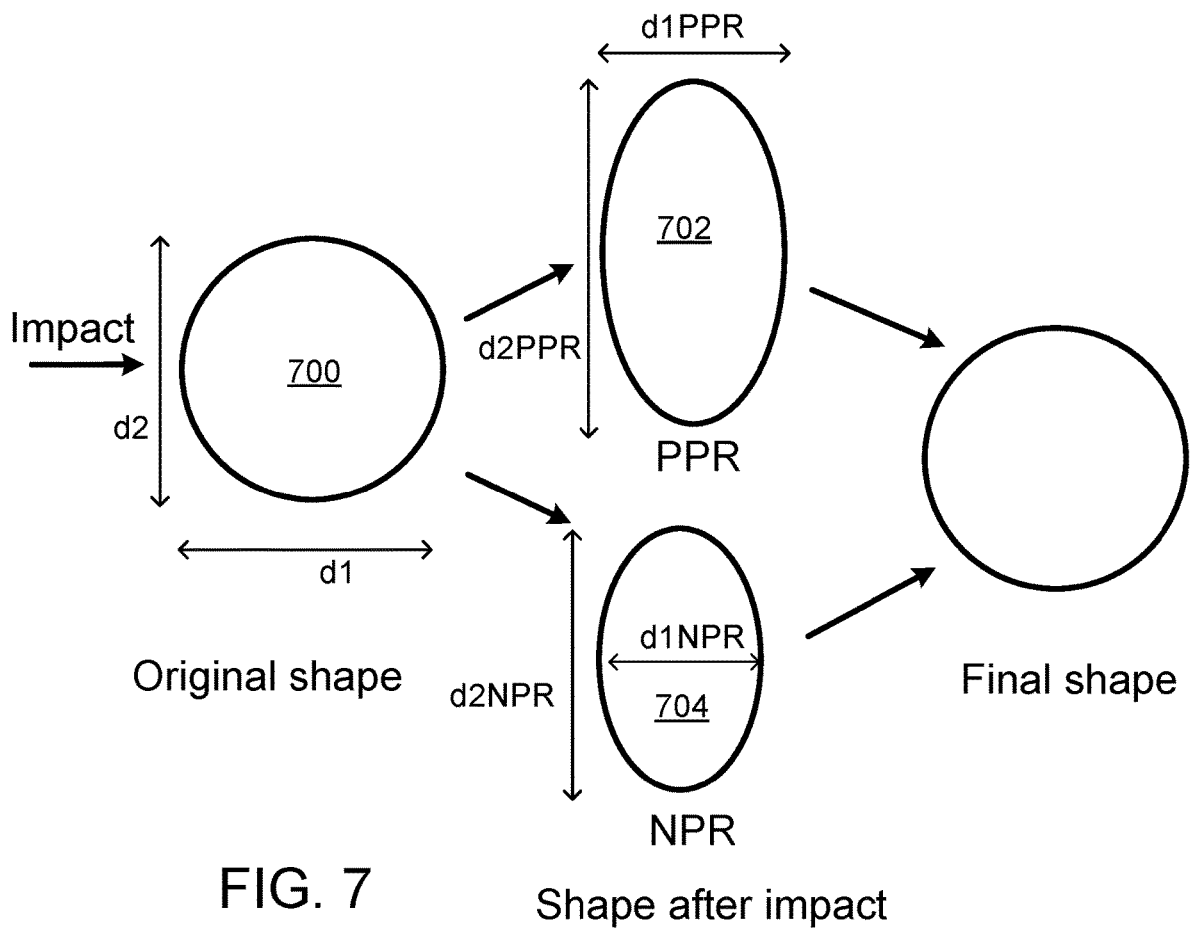
FIG. 7 is an illustration of balls with negative and positive Poisson's ratios.

FIG. 7 shows a schematic depiction of the change in diameter of a material 700 upon impact. Although the material 700 in FIG. 7 is shown as a rounded ball, a similar deformation occurs in materials of other shapes. Prior to impact, the material 700 has a diameter d1 in the direction of the impact and a diameter d2 in the direction perpendicular to the impact. If the material 700 is a PPR material, the material undergoes significant deformation (e.g., elastic deformation) into a shape 702, such that the diameter in the direction of the impact decreases to d1PPR and the diameter in the direction perpendicular to the impact increases to d2PPR. By contrast, if the material 700 is an NPR material, the material undergoes less extensive deformation into a shape 704. The diameter of the shape 704 in the direction of the impact decreases to d1NPR, which is approximately the same as d1PPR. However, the diameter of the shape 704 in the direction perpendicular to the impact also decrease, to d2NPR. The magnitude of the difference between d2 and d2NPR is less than the magnitude of the difference between d2 and d2PPR, meaning that the NPR material undergoes less deformation than the PPR ball.

Figure 8A:
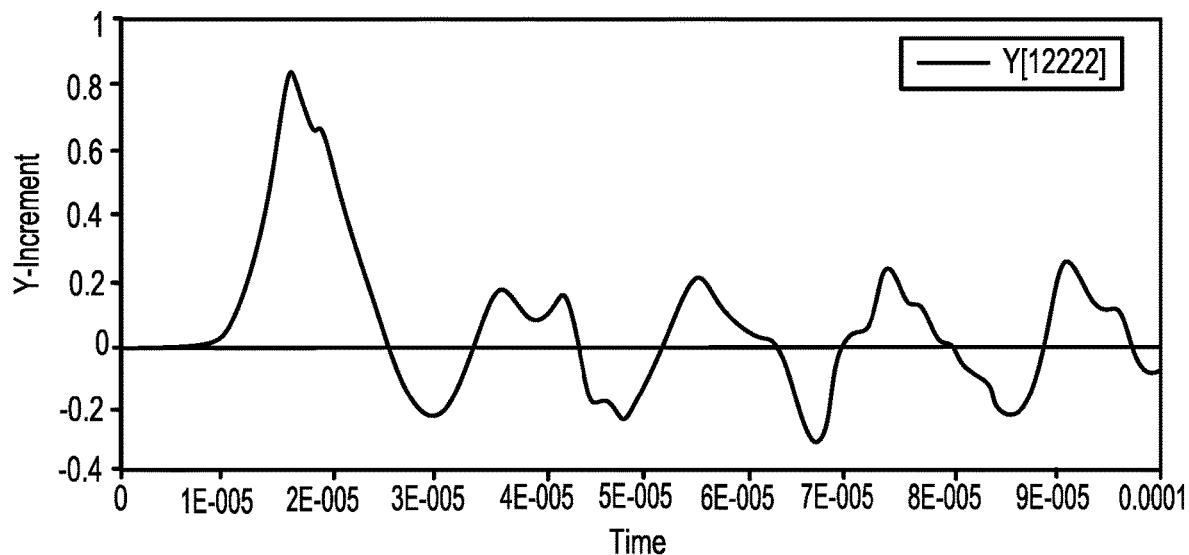
FIGS. 8A and 8B are plots of diameter versus time.
Figure 8B:
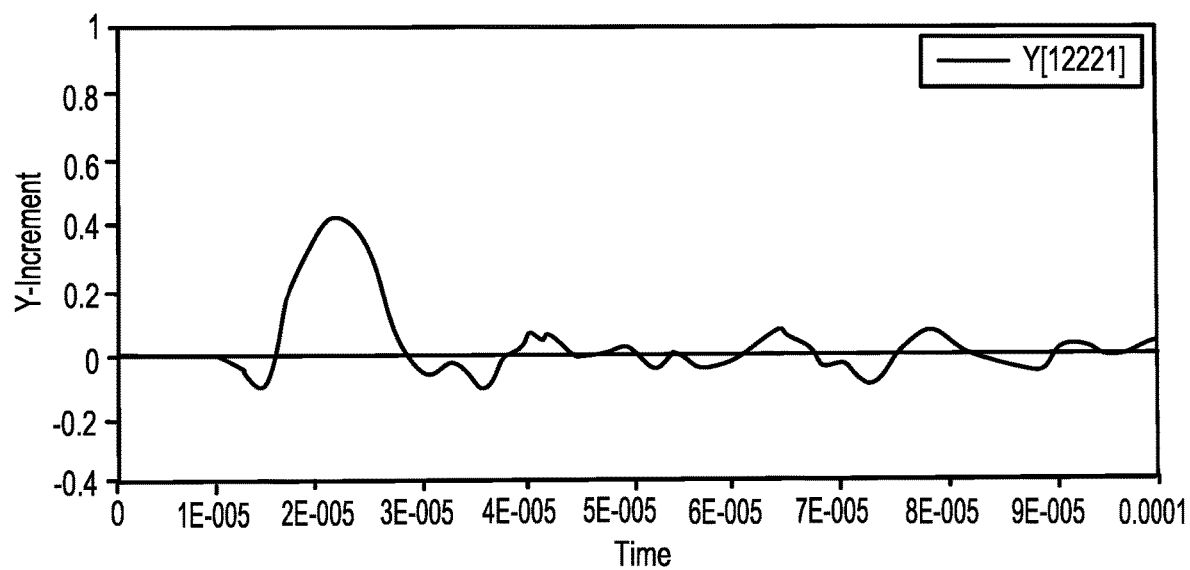

FIGS. 8A and 8B show plots of diameter versus time for a substantially spherical PPR material with a Poisson's ratio of 0.45 and an NPR material with a Poisson's ratio of −0.45, respectively, responsive to being struck with an equivalent force. In this example, the NPR material undergoes a smaller initial change in diameter than does the PPR material, and the oscillations in diameter are smaller in magnitude and dampen more quickly. Again, although FIGS. 8A and 8B are specific to substantially spherical materials, a similar behavior occurs in NPR and PPR materials of other shapes. The material of a door or window can be selected to balance rigidity and elasticity.

Figure 9:
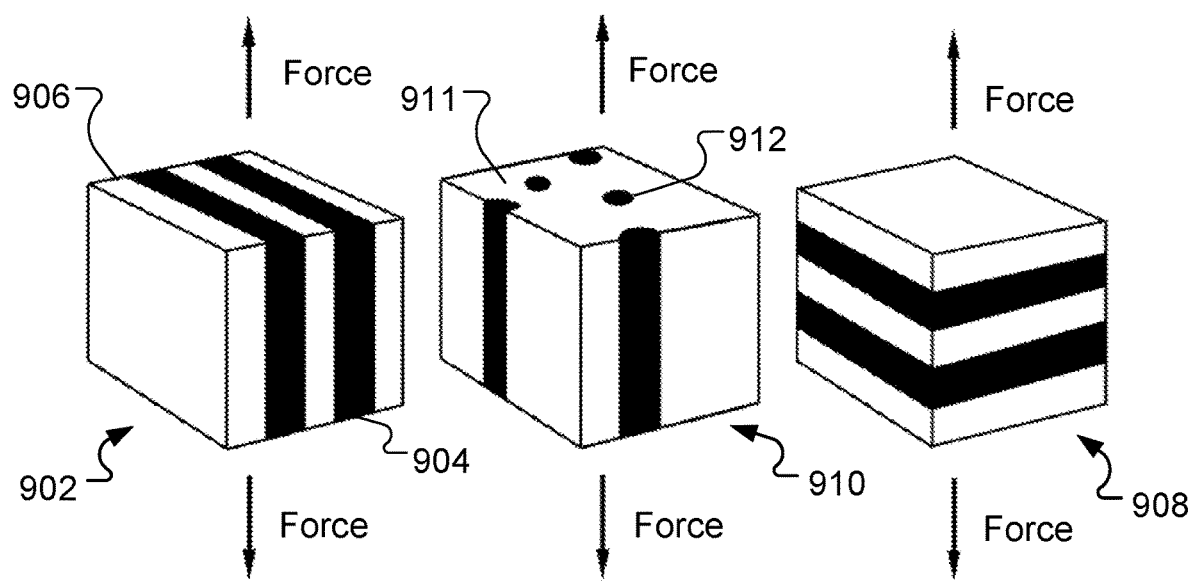
FIG. 9 is an illustration of composite materials.

FIG. 9 illustrates examples of NPR-PPR composite materials. An NPR-PPR composite material 902 is a laminar composite including alternating layers 904 of NPR material and layers 906 of PPR material. The layers 904, 908 are arranged in parallel to a force to be exerted on the composite material 902. Although the layers 904, 906 are shown as having equal width, in some examples, a laminar composite can have layers of different widths.

An NPR-PPR composite material 908 is a laminar composite including alternating layers of NPR material and PPR material, with the layers arranged perpendicular to a force to be exerted on the material 908. In some examples, the layers of a laminar composite are arranged at an angle to the expected force that is neither perpendicular nor parallel.

An NPR-PPR composite material 912 is a matrix composite including a matrix phase 911 of NPR material with a reinforcement phase 912 of PPR material. In the material 912, the reinforcement phase 912 includes fibers of the PPR material; in some examples, the reinforcement phase 912 can include particles or other configuration. In some examples, NPR-PPR composite materials can have a matrix phase of a PPR material with a reinforcement phase of an NPR material.

Figure 10:
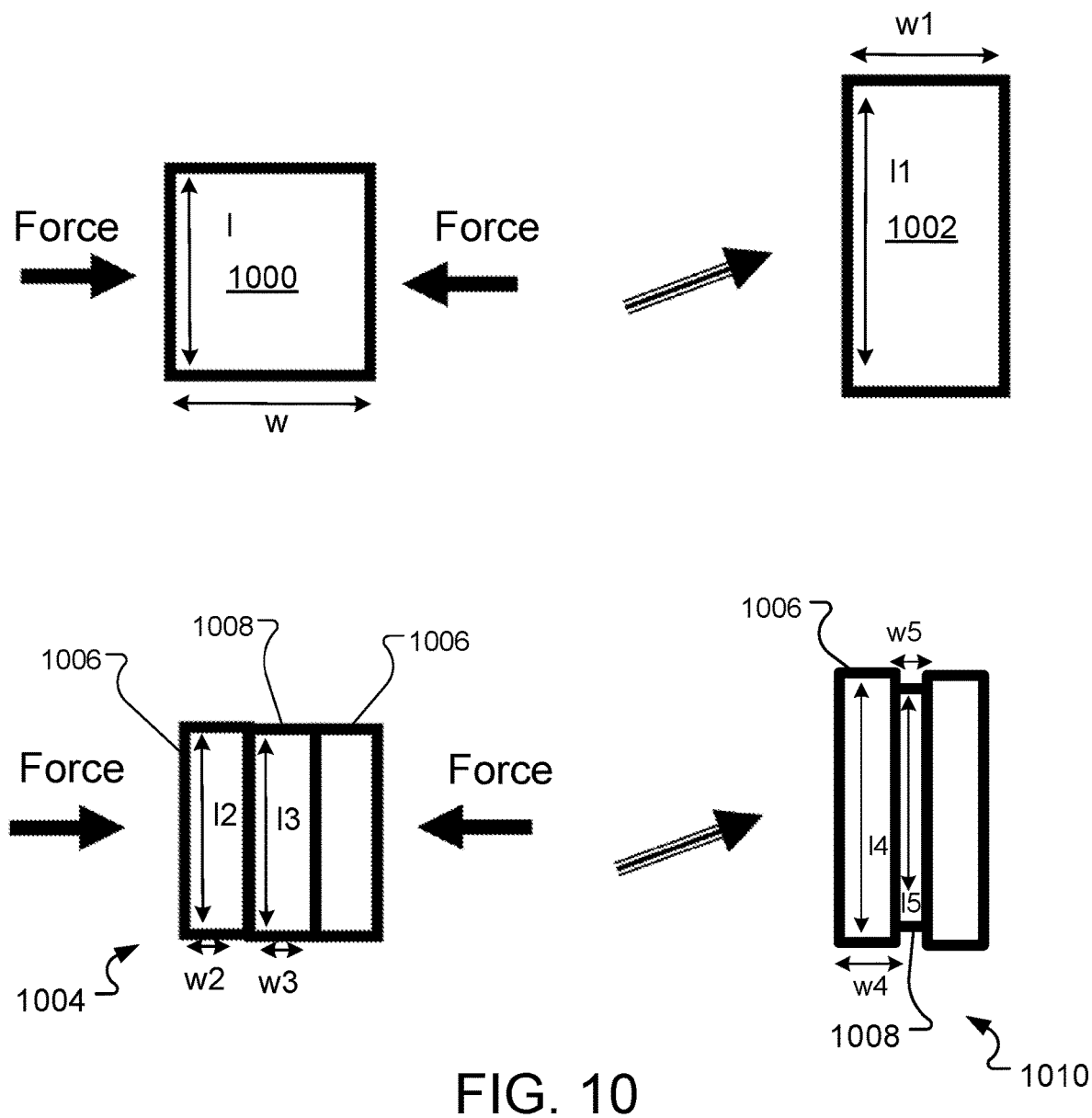
FIG. 10 is an illustration of a material with a positive Poisson's ratio and a composite material.

FIG. 10 illustrates the mechanical behavior of PPR and NPR/PPR composite materials. A hypothetical block 1000 of PPR material, when compressed along its width w, deforms into a shape 1002. The width w1 of the compressed block 1002 is less than the width w of the uncompressed block 1000, and the length l1 of the compressed block 1002 is greater than the length l of the uncompressed block: the material compresses along the axis to which the compressive force is applied and expands along a perpendicular axis.

A block 1004 of NPR/PPR composite material includes a region 1008 of NPR material sandwiched between two regions 1006 of PPR material. When the block 1004 of composite material is compressed along its width, the material deforms into a shape 1010. The PPR regions 1006 compress along the axis of compression and expand along a perpendicular axis, e.g., as described above for the block 1000 of PPR material, such that, e.g., the width w2 of a region 1006 of uncompressed PPR material compresses to a smaller width w4 and the length l2 of the region 1006 expands to a greater length l4. In contrast, the NPR region 1008 compresses along both the axis of compression and along the perpendicular axis, such that, e.g., both the width w3 and length l3 of the uncompressed NPR region 1008 are greater than the width w5 and length l5 of the compressed NPR region 1008.

Figure 11:
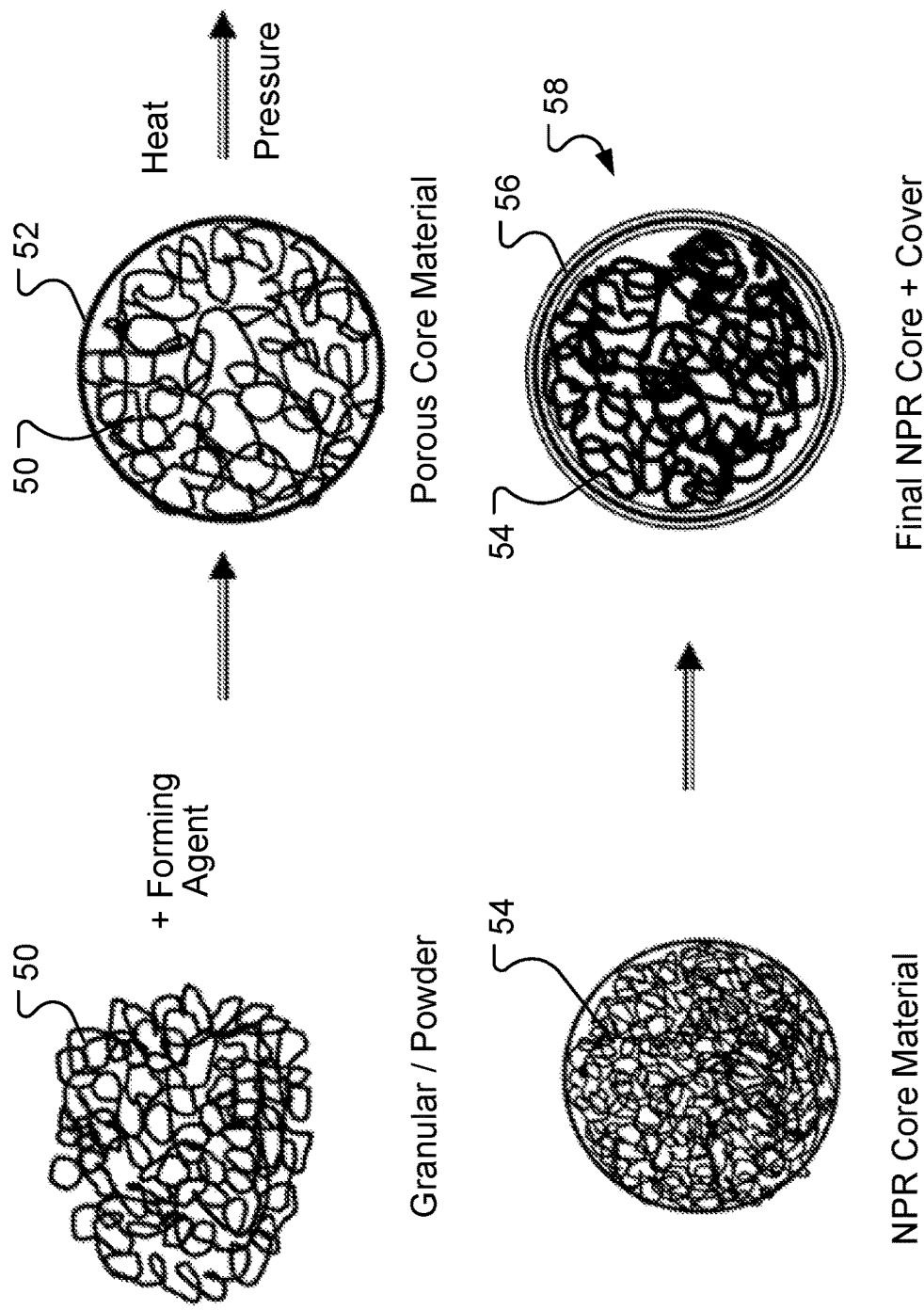
FIG. 11 is an illustration of a method of making a negative Poisson's ratio material.

FIG. 11 illustrates an example method of making an object, such as a portion of a door, formed of an NPR material. A granular or powdered material, such as a polymer material (e.g., a rubber) is mixed with a foaming agent to form a porous material 50. The porous material 50 is placed into a mold 52. Pressure is applied to compress the material 50 and the compressed material is heated to a temperature above its softening point. The material is then allowed to cool, resulting in an NPR foam 54. The NPR foam 54 is covered with an outer layer 56, such as a polymer layer, and heat and pressure is applied again to cure the final material into an object 58.

In some examples, a material can be formed into an NPR material by forming nanoscale or microscale structures, such as spheres or tubules, with the material.

Other methods can also be used to fabricate an object formed of an NPR material or an NPR-PPR composite material, such as a door or window. For example, various additive manufacturing (e.g., 3D printing) techniques, such as stereolithography, selective laser sintering, or other appropriate additive manufacturing technique, can be implemented to fabricate an object formed of an NPR material or an NPR-PPR composite. In some examples, different components of the object are made by different techniques. For example, a portion of a door (e.g., a rectangular panel) may be 3D printed while the window is not, or vice versa. Additive manufacturing techniques can enable seams to be eliminated.

Other embodiments are within the scope of the following claims.

What is claimed is:

1. A door comprising:
   a rectangular panel having a first face, a second face, and two pairs of opposing edges, in which the edges of each pair of edges are parallel and in which a first pair of edges is longer than a second pair of edges;
   in which the rectangular panel comprises a layered composite material, in which:
      a first layer of the composite material has a positive Poisson's ratio (PPR); and
      a second layer of the composite material is disposed in contact with the first layer and comprises a material having a negative Poisson's ratio (NPR), wherein the second layer of the composite material comprises an NPR foam;
   a hinge comprising plates joined together by a joint, in which a first one of the plates is attached to a first one of the edges of the first pair of edges and in which a second one of the plates extends beyond the first one of the edges;
   in which a handle opening is defined through a thickness of the rectangular panel.

2. The door of claim 1, in which the first layer of the composite material and the second layer of the composite material are disposed parallel to the first face of the door.

3. The door of claim 1, in which first layer of the composite material and the second layer of the composite material are disposed perpendicular to the first face of the door.

4. The door of claim 1, in which composite material comprises a third layer having a positive Poisson's ratio, in which the second layer comprising the NPR material is disposed between the first layer and the third layer of the composite material.

5. The door of claim 1, in which the second layer of the composite material comprises a re-entrant foam structure.

6. The door of claim 1, in which the NPR foam has a characteristic dimension of between 0.1 μm and 3 mm.

7. The door of claim 1, in which the second layer of the composite material comprises a metal, ceramic, or polymer having a negative Poisson's ratio.

8. The door of claim 1, comprising a lock at least partially disposed in an interior of the rectangular panel, in which the lock comprises an NPR material.

9. The door of claim 8, in which the lock comprises:
   a cylinder; and
   spring-loaded pins configured to engage with the cylinder to prevent the cylinder from turning,
   in which the cylinder, the pins, or both comprises an NPR material.

10. The door of claim 1, comprising a latch comprising:
    a face plate disposed on the first one of the edge of the first set of edges; and
    a bolt disposed in an interior of the rectangular panel and configured to extend beyond the first one of the edges of the first set of edges,
    in which the face plate, the bolt, or both comprises an NPR material.

11. The door of claim 10, in which the face plate, the bolt, or both comprises an NPR metal foam.

12. The door of claim 1, comprising a doorknob disposed in the handle opening, in which the doorknob comprises an NPR material.

13. The door of claim 12, in which the doorknob comprises an NPR metal foam or an NPR polymer foam.

14. The door of claim 1, comprising:
    a pet flap opening defined through the thickness of the rectangular panel, wherein the pet flap opening defines interior edges in the rectangular panel;
    a pet flap frame attached to the interior edges in the rectangular panel, wherein the pet flap frame comprises an NPR material; and
    a pet flap attached to the pet flap frame along an edge of the interior edges of the pet flap frame and disposed within the pet flap opening.

15. A door comprising:
    a rectangular panel having a first face, a second face, and two pairs of opposing edges, in which the edges of each pair of edges are parallel and in which a first pair of edges is longer than a second pair of edges;
    in which the rectangular panel comprises a layered composite material, in which:
       a first layer of the composite material has a positive Poisson's ratio (PPR); and
       a second layer of the composite material is disposed in contact with the first layer and comprises a material having a negative Poisson's ratio (NPR);
    a hinge comprising plates joined together by a joint, in which a first one of the plates is attached to a first one of the edges of the first pair of edges and in which a second one of the plates extends beyond the first one of the edges, wherein the plates of the hinge comprise an NPR material;
    in which a handle opening is defined through a thickness of the rectangular panel.

16. The door of claim 15, in which the plates of the hinge comprises an NPR-PPR composite material.

17. The door of claim 15, in which the plates of the hinge comprise an NPR metal foam.

18. The door of claim 1, in which a window opening is defined through the thickness of the rectangular panel, and in which the door comprises:
- a window disposed in the window opening; and
- a seal disposed around edges of the window opening, in which the seal comprises an NPR material.

19. The door of claim 18, in which the window comprises an NPR material.

20. The door of claim 19, in which the window comprises an NPR ceramic foam that is transparent to visible light.

21. The door of claim 18, in which the seal comprises an NPR polymer foam.

* * * * *